(12) United States Patent
Jain

(10) Patent No.: US 6,938,065 B2
(45) Date of Patent: Aug. 30, 2005

(54) SYSTEM AND METHOD FOR CONTROLLING INCLUSION OF EMAIL CONTENT

(75) Inventor: Anuj Jain, Raleigh, NC (US)

(73) Assignee: Ericsson Inc., Research Triangle Park, NC (US)

(*) Notice: Subject to any disclaimer, the term of this patent is extended or adjusted under 35 U.S.C. 154(b) by 465 days.

(21) Appl. No.: 09/734,992

(22) Filed: Dec. 12, 2000

(65) Prior Publication Data

US 2002/0073159 A1 Jun. 13, 2002

(51) Int. Cl.⁷ .............................................. G06F 15/16
(52) U.S. Cl. ........................................ 709/201; 709/207
(58) Field of Search .................................... 709/206, 207

(56) References Cited

U.S. PATENT DOCUMENTS

| | | | |
|---|---|---|---|
| 5,619,648 A | * 4/1997 | Canale et al. | 709/206 |
| 5,958,005 A | * 9/1999 | Thorne et al. | 709/202 |
| 5,966,351 A | 10/1999 | Carleton et al. | |
| 5,974,448 A | * 10/1999 | Yamauchi et al. | 709/206 |
| 6,023,700 A | * 2/2000 | Owens et al. | 707/10 |
| 6,072,942 A | * 6/2000 | Stockwell et al. | 709/206 |
| 6,073,133 A | * 6/2000 | Chrabaszcz | 707/10 |
| 6,073,165 A | * 6/2000 | Narasimhan et al. | 709/206 |
| 6,101,531 A | * 8/2000 | Eggleston et al. | 709/206 |
| 6,112,227 A | * 8/2000 | Heiner | 709/203 |
| 6,167,434 A | * 12/2000 | Pang | 709/206 |
| 6,199,103 B1 | * 3/2001 | Sakaguchi et al. | 709/206 |
| 6,230,186 B1 | * 5/2001 | Yaker | 709/206 |
| 6,311,210 B1 | * 10/2001 | Foladare et al. | 709/206 |
| 6,351,763 B1 | * 2/2002 | Kawanaka | 709/206 |
| 6,442,589 B1 | * 8/2002 | Takahashi et al. | 709/203 |
| 6,449,635 B1 | * 9/2002 | Tilden et al. | 709/206 |
| 6,487,586 B2 | * 11/2002 | Ogilvie et al. | 709/206 |
| 6,493,007 B1 | * 12/2002 | Pang | 715/835 |
| 6,591,367 B1 | * 7/2003 | Kobata et al. | 713/201 |
| 6,721,784 B1 | * 4/2004 | Leonard et al. | 709/206 |
| 6,769,067 B1 | * 7/2004 | Soong | 713/201 |

FOREIGN PATENT DOCUMENTS

| | | |
|---|---|---|
| EP | 0721268 | 7/1996 |
| WO | WO 0008794 | 5/2000 |
| WO | WO 0051032 | 8/2000 |

\* cited by examiner

*Primary Examiner*—Saleh Najjar
(74) *Attorney, Agent, or Firm*—Coats & Bennett, P.L.L.C.

(57) ABSTRACT

A system and method for controlling inclusion of email content. The sender of an email message may select email message text to be excluded from messages, e.g. a reply or forward, originating from a recipient of the message. Specific recipients may also be identified by a sender, whereby the sent message will be excluded from messages originating from the specific recipients. A computer-readable medium including instructions allowing email content exclusion is also provided.

43 Claims, 5 Drawing Sheets

SYSTEM AND METHOD FOR CONTROLLING INCLUSION OF EMAIL CONTENT

BACKGROUND OF THE INVENTION

The present invention relates to a system and method of sending electronic mail, and more particularly, to a system and method for the sender of an electronic mail message to control inclusion of the sender's text at the recipient's side.

Electronic mail (hereinafter "email") is widely used as a method of communication. People with email accounts, e.g. from an internet service provider, may easily compose and send an email message and attachments including text, graphics, audio, video, and/or multimedia components using a number of commercially available email management software applications. The message may be sent via a computer network, e.g. the Internet, to a designated recipient or recipients.

The message itself includes data identifying the sender of the message, thereby facilitating facile reply by the recipient. In fact, typical email management software may include a reply function that a recipient may use to automatically address a reply message to a sender. It has become a common practice for the recipient of an email message to include some or all of the sender's text when replying to the email. In fact, many email users either configure their software to do so automatically or use software that does so by default or by pre-configuration.

Email programs also may allow the original recipient of a message to forward the message to other parties. The forwarded message may include a message from the original recipient as well as the text generated by the original sender. Thus, as a message is passed to multiple recipients or between a recipient and a sender, the transmitted email message may progressively increase in size as each recipient adds to the message.

BRIEF SUMMARY OF THE INVENTION

A system consistent with the invention for controlling email content includes at least one transmitter, e.g. a personal computer, mobile terminal, etc., configured to transmit an email message including at least a portion identified as excluded content. A receiver in communication with the transmitter through a network is configured to exclude the excluded content from a message originating from the receiver.

One method of controlling inclusion of email content consistent with the invention includes: selecting at least a portion of an email message as excluded content; and transmitting the email message to a recipient configured to exclude the excluded content from a message originating from the recipient. Another method consistent with the invention includes: selecting at least one keyword; identifying as excluded content at least a portion of an email message including the keyword; and transmitting the email message to a recipient configured to exclude the excluded content from a message originating from the recipient. A method consistent with the invention may also include: identifying at least one excluded recipient; and transmitting an email message to the excluded recipient, the excluded recipient being configured to exclude at least a portion of the email message from a message originating from the excluded recipient.

A computer-readable medium consistent with the invention has computer-executable instructions stored thereon for controlling email content, the instructions including: instructions for allowing a sender to identify at least a portion of an email message as content to be excluded from a message originating from a recipient of the email message; and instructions allowing the sender to send the email message.

BRIEF DESCRIPTION OF THE DRAWING

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
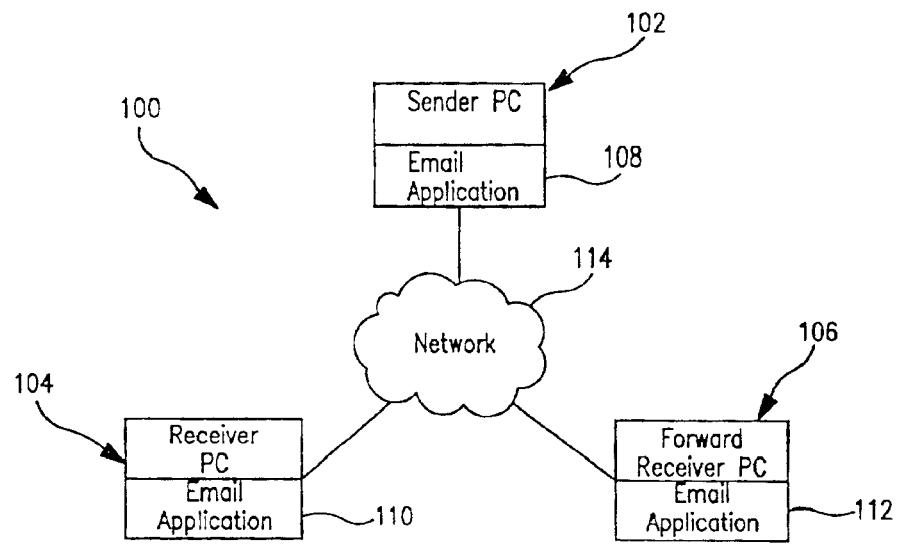
FIG. 1 illustrates an exemplary system consistent with the invention.

With reference now to FIG. 1, there is illustrated an exemplary system 100 consistent with the invention. For simplicity and ease of explanation, the present invention will be described herein in connection with email applications running on a PC. It is to be understood, however, that the principles of the invention may be applied, not only to PC's, but also to any device configured for running an email application, including servers and mobile terminals. The term "mobile terminal", as used herein, may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a positioning receiver, such as a GPS receiver; and a conventional laptop and/or palmtop receiver or other appliance that includes a radiotelephone transceiver.

In the illustrated exemplary embodiment, email messages may be exchanged between a sender personal computer (hereinafter "PC") 102, a receiver PC 104, and a forward receiver PC 106. Each PC 102, 104, 106 may include an operating system running an email application 108, 110, 112, respectively. The email application may be stored on a computer-readable medium.

In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). It is noted that the computer-usable or computer-readable memory could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The email applications 108, 110, 112 facilitate communication of email messages over a network 114. Generally the network 114 allows communication between the PCs 102, 104, 106, using well-known communication protocols, so that the communication links between the PCs may be transparent to the users. For example, those skilled in the art will recognize that the network may include an email server to which outgoing email messages are transmitted by a sender, e.g. using an SMTP or other protocol. The message may be transmitted to the intended recipient upon a request by the recipient for the message, e.g. using POP protocol.

In the illustrated embodiment, the network 114 may be viewed as a local area network (LAN) serving three PCs. FIG. 1 is illustrated in this manner for ease of explanation. It should be understood, that the principles of the present invention may be applied in connection with any number of users, and in connection with any network configuration that facilitates communication between the users, including wire-based and cellular or wireless networks using air interfaces, such as GSM, TDMA, CDMA or FDMA.

Figure 2:
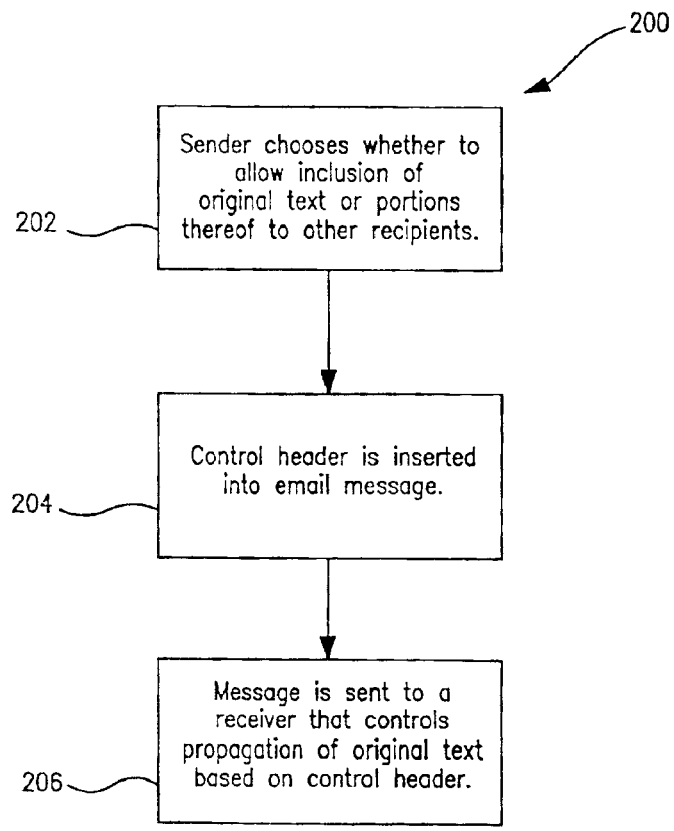
FIG. 2 illustrates an exemplary process flow consistent with the invention.

FIG. 2 illustrates an exemplary process flow consistent with the invention. In general, the sender of an email message. e.g. from sender PC 102, may elect 202 whether he or she wants to allow the receiver, e.g. receiver PC 104, to include the text of the email, or portions thereof, in replies to the sender or forwarding of the message to a forward receiver, e.g. forward receiver PC 106. The sender's email application inserts a control header 204 into the email message to control propagation of the text in accordance with the sender's selection. The message is sent to a receiver that controls propagation of the original text based on the control header 206. The sender thus has control over propagation of the original message, and can limit propagation to only selected recipients.

Figure 3:
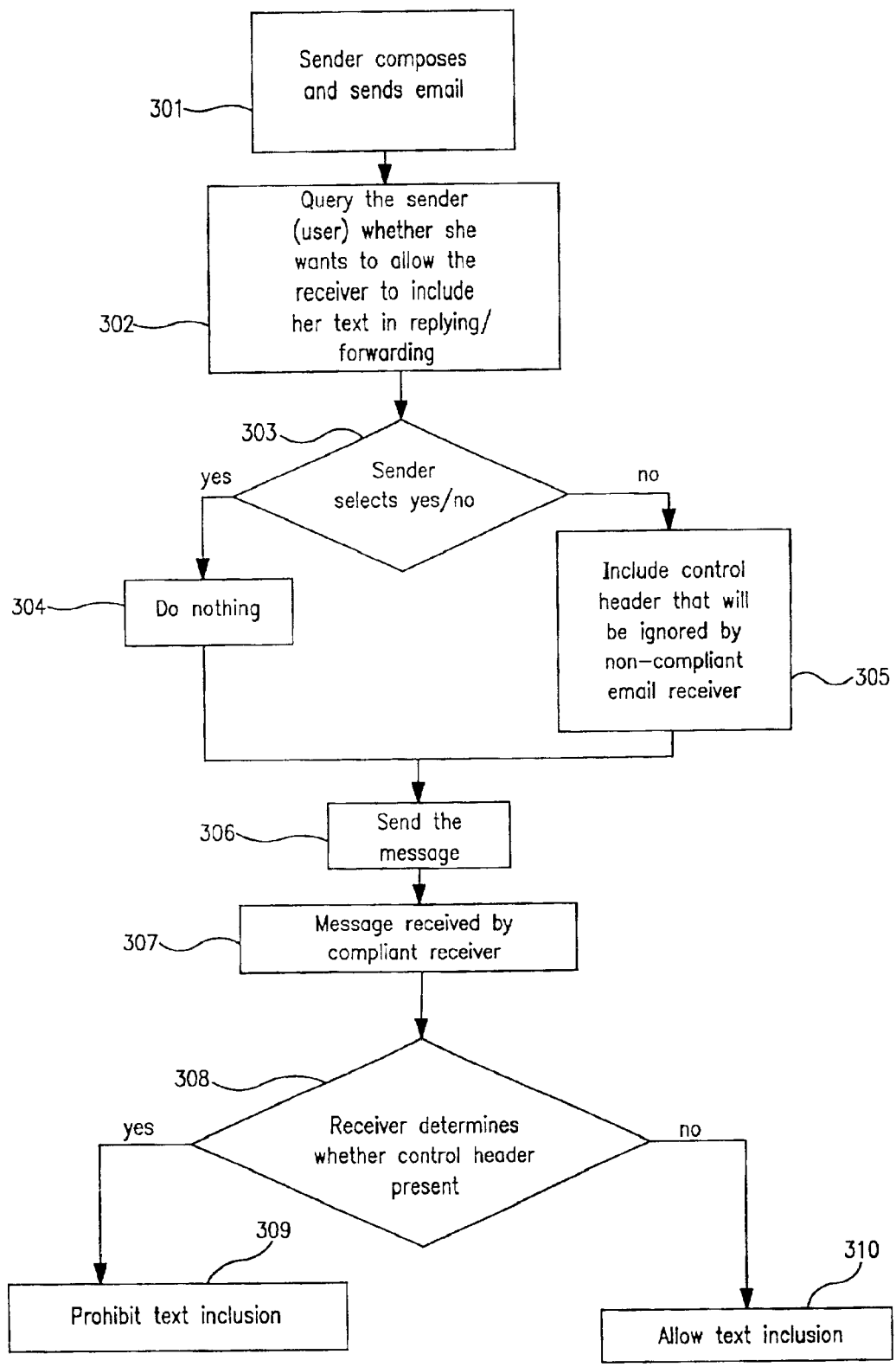
FIG. 3 is a flowchart of a per-email inclusion control method consistent with the present invention.

A system and method consistent with the invention may be provided in a variety of embodiments. FIG. 3, for example, illustrates an exemplary process flow for email text inclusion control, on a per-email basis, consistent with the present invention. As shown, the sender may compose an email message using an email management application, and send 301 the email message by, for example, pressing a "send" or issuing a similar command. The application presents the sender with a dialog box or similar input interface, asking whether the sender wants to allow the receiver to include the sender's text in replying or forwarding messages 302. The dialog box or other interface may include a yes/no button or similar user input method for selection of a yes-or-no option.

Figures 6, 7:
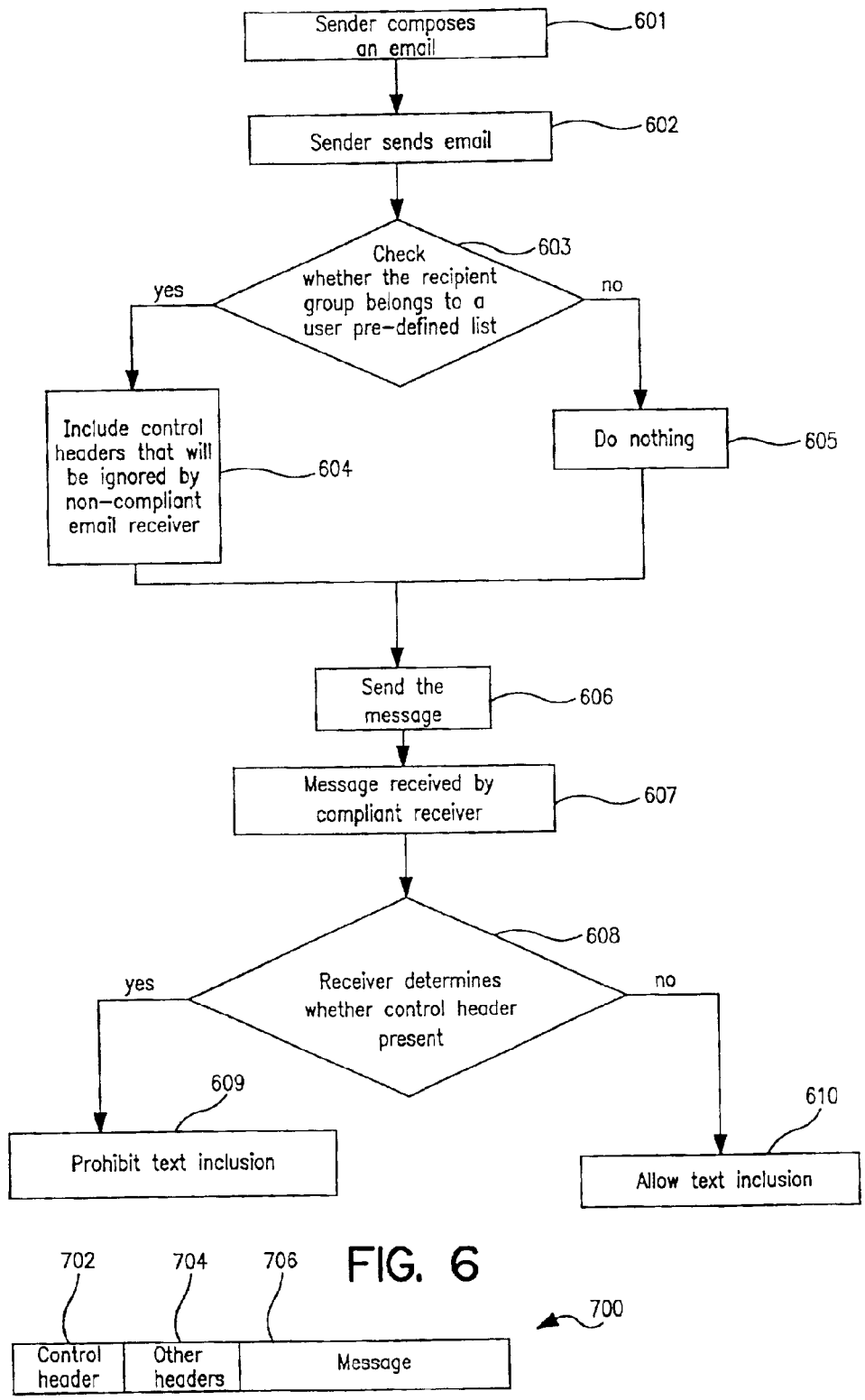
FIG. 6 is a flowchart of a predefined recipient or group inclusion control method consistent with the present invention.
FIG. 7 is a diagrammatic illustration of a typical data format for an email message consistent with the present invention.

The sender selects either "yes" or "no" 303 to indicate whether the original text may be included in replies or forwarded messages. If the sender selects "no", a control header is included in the message 305 before the message is sent 306. Those skilled in the art will recognize that many headers may be included in a typical email message. An exemplary email data format 700 is illustrated in FIG. 7. As shown, the email may include a control header 702 consistent with the invention, other headers 704 providing control instructions or information, e.g. for intermediate servers, and the email message 706.

The message may be received by a compliant receiver 307, e.g. a receiver configured to recognize the control header as an instruction to exclude the sender's text from a reply or forwarded message. If the message is received by non-compliant receiver, the header is ignored and no exclusion occurs. The email management application in the compliant receiver determines whether the control header is present 308. If the control header is present, the email application in the receiver excludes the text of the received message from replies or forwarded messages 309.

If the sender selects "yes" in response to the query 302, then the control header is not inserted 304. The message is sent 306 and received 307 by the receiver. The receiver recognizes the absence of the control header 308, and allows the text to be included in replies or forwarded messages 310.

Figure 4:
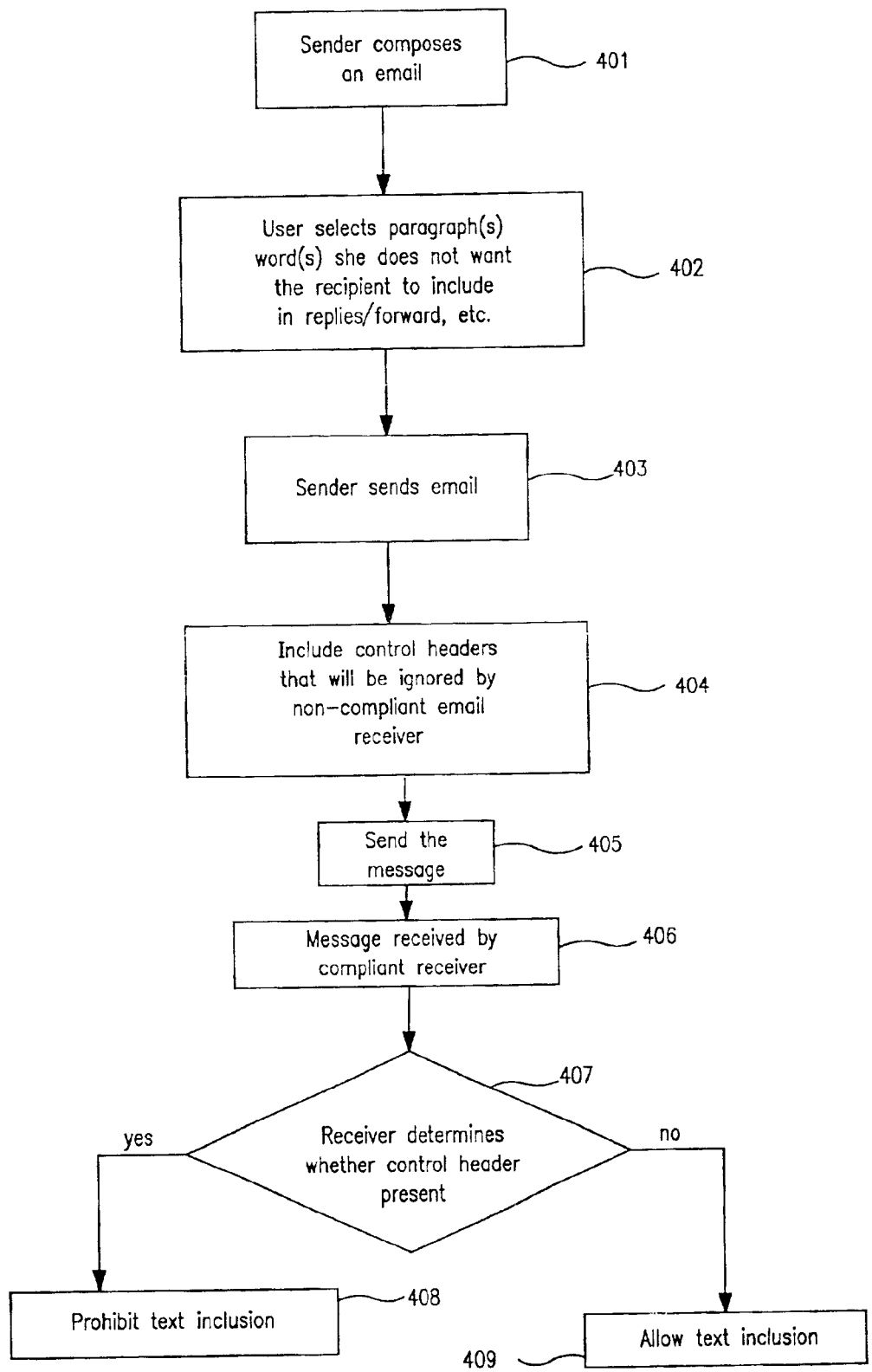
FIG. 4 is a flowchart of a per-word or per-paragraph inclusion control method consistent with the present invention.

FIG. 4 illustrates an exemplary process flow for email text inclusion control, on a per-word or per-paragraph basis, consistent with the present invention. In this embodiment, the sender may select text, e.g. characters, words, and/or paragraphs, and assign to the selected text the attribute of inclusion control. This attribute may be assigned, for example, in a manner similar to that associated with selecting a font or a color for the selected text.

As shown, the sender composes an email message 401 and selects paragraphs or words he or she wants to preclude the recipient from including in a reply to or forwarding of the email message 402. The sender then issues a command to send the message 403, e.g. presses the "send" button established by the email application. The sender's email application inserts control headers in the message 404, which will be recognized by a receiving compliant email application as an instruction not to permit inclusion of the selected words or paragraphs of sender's text in a reply or forwarded message and the message is sent 405. The control header will be ignored by a noncompliant email application.

Upon receipt of the email message by a compliant email application 406, a determination is made whether the control header is present 407. If the control header is present, the receiving email application excludes the selected words or paragraphs in a reply to or forwarding of the email message 408. If the control header is not present, text inclusion is permitted 409.

Figure 5:
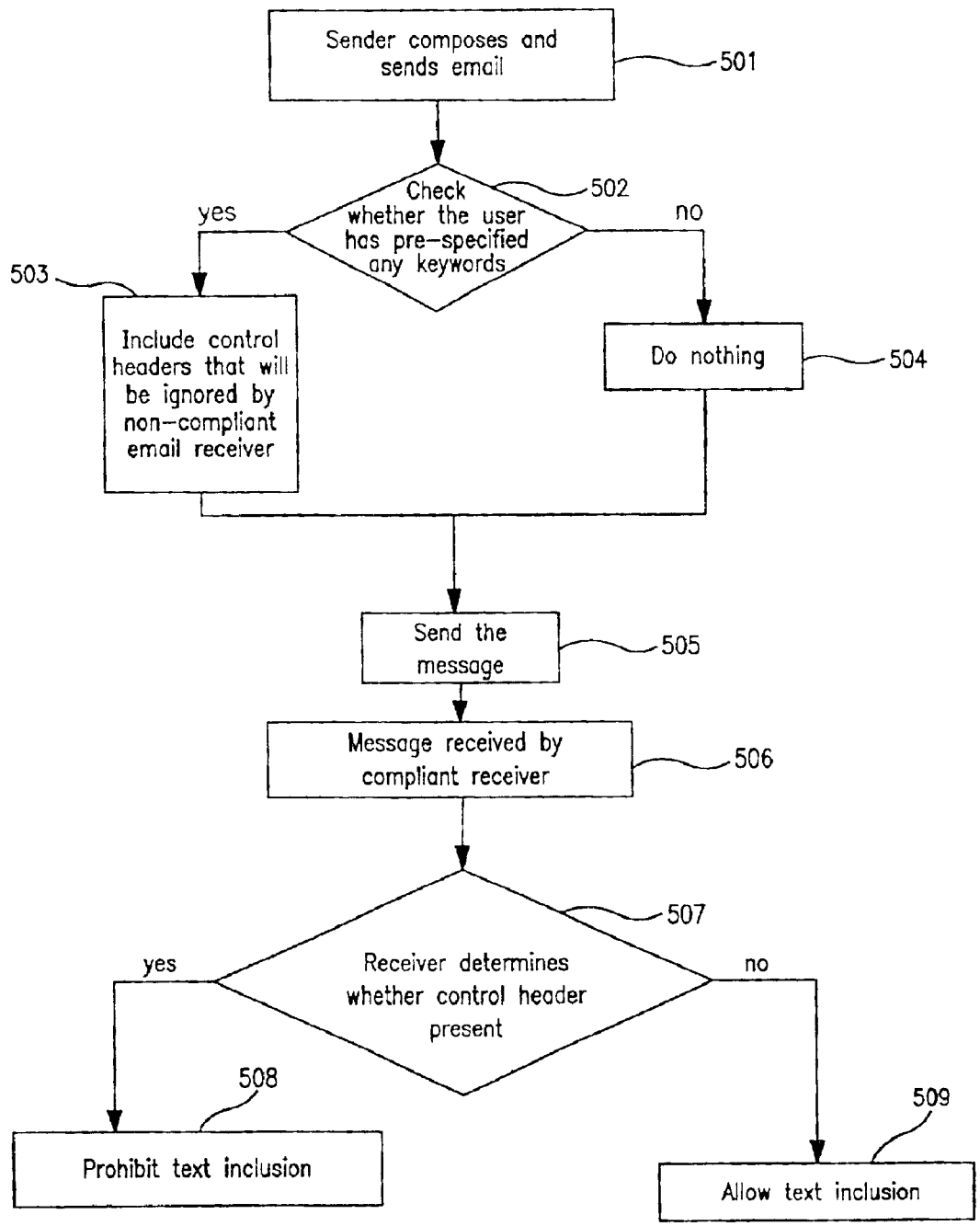
FIG. 5 is a flowchart of a predefined keyword inclusion control method consistent with the present invention.

FIG. 5 illustrates an exemplary process flow for email text inclusion control, on the basis of predetermined keywords, consistent with the present invention. In this embodiment, the sender may specify keywords to prevent some or all of an email message from being included in a reply or forward if one or more of the keywords appear in the message. First, the sender composes an email message and issues a command to send the message. The sender's email application checks to see whether the sender has pre-specified any keywords for non-inclusion in replies or forwards 502. If so, and if one or more of those keywords appear in the text of the email message, the email application includes control headers in the message 503. The control headers are recognized by a receiving compliant email application as an instruction not to permit inclusion of the entire message (or, alternatively, of only the pre-specified keywords which appear in the sender's text) in a reply or forwarded message. The message is then sent 505.

If the sender has not pre-specified any keywords, or if no pre-specified keywords appear in the text of the email message, no inclusion of control headers takes place 504 before the message is sent 505. Upon receipt of the email message by a compliant application 506, a determination is made whether the control header is present 507. If the control header is present, the email application at the receiver does not allow inclusion of the sender's email message (or, alternatively, of only the pre-specified keywords which appear in the sender's text) in a reply to or forwarding of the email message 508. If the control header is not present, text inclusion is permitted 509.

FIG. 6 illustrates an exemplary process flow for email text inclusion control, on the basis of predetermined recipients or recipient groups, consistent with the present invention. In this embodiment, the sender may specify one or more recipients or groups of recipients for which inclusion of the sender's text or a portion thereof is prohibited. First, the sender composes an email message 601 and issues a command to send the message 602. The sender's email application checks to see whether the sender has pre-specified any recipients or recipient groups for which non-inclusion of the sender's email in replies or forwards is desired 603. If so, and if one or more of the specified recipients of the email is one of the pre-specified recipients or recipient groups, the client includes control headers in the message 604 which will be recognized by a compliant email client as an instruction not to permit inclusion of the message in a reply or forwarded message for those recipients or recipient groups (and which will be ignored by a noncompliant email client) and the message is sent 606. If the sender has not pre-specified any recipients for which non-inclusion is desired, or if none of the specified recipients of the email are pre-specified recipients or recipient groups, no inclusion of control headers takes place 605 before the message is sent 606.

Upon receipt of the email message by a compliant client 607, a determination is made whether the control header is present 608. If the control header is present, the client does not allow inclusion of the sender's email message in a reply to or forwarding of the email message 609. If the control header is not present, text inclusion is permitted 610.

Thus, a method for the sender of an email to control the inclusion of text on the recipient's side is provided. As those skilled in the art will recognize, one or more of the features of the foregoing described embodiments may be combined, and the described embodiments are therefore not mutually exclusive. The present invention also contemplates specific extensions which are ignored by noncompliant email clients, and which are recognized by compliant clients. This client-specific use of extensions may be implemented in a manner similar to that used for a feature such as the "message recall" feature of Microsoft's Outlook™ software.

Of course, depending on the specific embodiment of the present invention, the recipient may be able to cut and paste the text, thereby circumventing the inclusion controls. However, conscious effort and multiple burdensome steps may be required on the part of the recipient in order to do so. Additionally, in another embodiment of the present invention, prevention of inclusion control circumvention may be achieved by implementing a subroutine or module in the receiver's email application which prevents the recipient from cutting and pasting some or all of the sender's email. The sender email application software may also be designed to be configurable for replies and forwarding separately, i.e. the sender may specify that the recipient can include the message when replying but not forwarding, or vice-versa.

As those skilled in the art will recognize, the present invention may be embodied in a variety of systems, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program instructions embodied in the medium for use by or in connection with an instruction execution system.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A method of controlling retransmission of email message content in an email message by a recipient of the email message, the method comprising:

selecting a portion of email message content in a first email message that is to be sent to a recipient;

inserting control information into the first email message to control retransmission of the selected portion of the email message content in a second email message originating from the recipient of the first email message, without deleting the recipient's copy of the first email message; and transmitting the first email message to the recipient.

2. The method of claim 1, wherein the second email message comprises a reply message, and wherein the control information controls inclusion of the selected portion of the email message content in the reply message.

3. The method of claim 1, wherein the second email message comprises a forwarding message, and wherein the control information controls inclusion of the selected portion of the email message content in the forwarding message.

4. The method of claim 1, wherein the control information causes at least the selected portion of the email message content to be excluded from the second email message.

5. The method of claim 1, wherein the control information causes the entire email message content to be excluded from the second email message.

6. The method of claim 1, wherein selecting a portion of email message content comprises selecting a portion of the email message content to be excluded from the second email message, and wherein the control information causes the selected portion of the email message content in the first email message to be excluded from the second email message.

7. The method of claim 6, wherein selecting a portion of the email message content to be excluded from the second email message comprises receiving a keyword entered by a user and selecting portions of the email message content based on the keyword entered by the user.

8. The method of claim 7, wherein selecting a portion of the email message content based on the keyword entered by the user comprises selecting each occurrence of the keyword in the email message content.

9. The method of claim 8, wherein selecting a portion of the email message content based on the keyword entered by the user comprises selecting predetermined text encompassing occurrences of the keyword in the email message content.

10. The method of claim 1, wherein the control information causes at least the selected portion of the email message content to be excluded from the second email message based on the identity of the recipient.

11. A method of controlling retransmission of email message content in an email message by a recipient of the email message, the method comprising:
receiving a first email message comprising email message content and control information to control retransmission of the email message content; and
excluding selected portions of the email message content in the first email message from a second email message originating from the recipient of the first email message based on the control information in the first email message, without deleting the recipient's copy of the first email message.

12. The method of claim 11, wherein the second email message comprises a reply message, and wherein the control information controls inclusion of the selected portions of the email message content in the reply message.

13. The method of claim 11, wherein the second email message comprises a forwarding message, and wherein the control information controls inclusion of the selected portions of the email message content in the forwarding message.

14. The method of claim 11, wherein excluding selected portions of the email message content in the first email message from a second email message originating from the recipient of the first email message based on the control information in the first email message comprises excluding portions of the email message selected by a sender of the first email message.

15. The method of claim 11, wherein excluding selected portions of the email message content in the first email message from a second email message originating from the recipient of the first email message based on the control information in the first email message comprises excluding the entire email message content from the second email message.

16. The method of claim 11, wherein the control information causes at least a portion of the email message content to be excluded from the second email message based on the identity of the recipient.

17. An apparatus for sending email comprising:
a computing device programmed to insert control information into a first email message that controls retransmission of a selected portion of the email message content in a second email message originating from a recipient of the first email message, without deleting the recipient's copy of the first email message.

18. The apparatus of claim 17, wherein the second email message comprises a reply message, and wherein the control information controls inclusion of the selected portion of the email message content in the reply message.

19. The apparatus of claim 17, wherein the second email message comprises a forwarding message, and wherein the control information controls inclusion of the selected portion of the email message content in the forwarding message.

20. The apparatus of claim 17, wherein the control information causes at least the selected portion of the email message content to be excluded from the second email message.

21. The apparatus of claim 20, wherein the control information causes the entire email message content to be excluded from the second email message.

22. The apparatus of claim 20, wherein the computing device is programmed to select the portion of the email message content to be excluded from the second email message based on user input, and wherein the control information causes the selected portion of the email message content in the first email message to be excluded from the second email message.

23. The apparatus of claim 22, wherein the computing device is programmed to select the portion of the email message content to be excluded from the second email message based on a keyword entered by a user.

24. The apparatus of claim 23, wherein the computing device is programmed to select text based on occurrences of the keyword in the email message content.

25. The apparatus of claim 23, wherein the computing device is programmed to select predetermined text encompassing each occurrence of the keyword in the email message content.

26. The apparatus of claim 17, wherein the control information causes at least the selected portion of the email message content to be excluded from the second email message based on the identity of the recipient.

27. An apparatus for sending email comprising:
a computing device programmed to exclude a selected portion of email message content in a first email message from a second email message originating from the recipient of the first email message based on control information in the first email message without deleting the recipient's copy of first email message.

28. The apparatus of claim 27, wherein the second email message comprises a reply message, and wherein the control information controls inclusion of the selected portion of the email message content in the reply message.

29. The apparatus of claim 27, wherein the second email message comprises a forwarding message, and wherein the control information controls inclusion of the selected portion of the email message content in the forwarding message.

30. The apparatus of claim 27, wherein the control information causes at least the selected portion of the email message content in the first email message selected by a sender to be excluded from the second email message.

31. The apparatus of claim 27, wherein the control information causes the entire email message content in the first email message to be excluded from the second email message.

32. An email application stored in a computer-readable medium, the program comprising:
code allowing insertion of control information into a first email message to control retransmission of a selected portion of email message content in the first email message in a second email message originating from a recipient of the first email message without deleting the recipient's copy of the first email message.

33. The application according to claim 32, wherein the second email message comprises a reply message, and wherein the control information controls inclusion of the selected portion of the email message content in the reply message.

34. The application of claim 32, wherein the second email message comprises a forwarding message, and wherein the control information controls inclusion of the selected portion of the email message content in the forwarding message.

35. The application of claim 32, wherein the control information causes at least the selected portion of the email message content to be excluded from the second email message.

36. The application of claim 32, wherein the control information causes the entire email message content to be excluded from the second email message.

37. The application of claim 32, wherein the control information causes at least the selected portion of the email message content to be excluded based on the identity of the recipient.

38. An email application stored in a computer-readable medium, the email application comprising:

code to exclude selected portions of email message content in a first email message from a second email message originating from a recipient of the first email message based on control information in the first email message without deleting the recipient's copy of the first email message.

39. The application of claim 38, wherein the second email message comprises a reply message, and wherein the control information controls inclusion of the email message content in the reply message.

40. The application of claim 38, wherein the second email message comprises a forwarding message, and wherein the control information controls inclusion of the email message content in the forwarding message.

41. The application of claim 38, wherein the code causes the selected portions of the email message content of the first message based on a selection by a sender of the first message.

42. The application of claim 38, wherein the code causes the entire email message content of the first email message to be excluded from the second email message.

43. The application of claim 38, wherein the code causes at least a portion of the email message content to be excluded from the second email message based on the identity of the recipient.

* * * * *